United States Patent
Taylor

(10) Patent No.: US 11,497,347 B2
(45) Date of Patent: Nov. 15, 2022

(54) CHAFING DISH HAVING RETRACTABLE COVER AND LID THEREFOR

(71) Applicant: Shawn Taylor, New Orleans, LA (US)

(72) Inventor: Shawn Taylor, New Orleans, LA (US)

( * ) Notice: Subject to any disclaimer, the term of this patent is extended or adjusted under 35 U.S.C. 154(b) by 821 days.

(21) Appl. No.: 16/382,430

(22) Filed: Apr. 12, 2019

(65) Prior Publication Data

US 2020/0121123 A1    Apr. 23, 2020

Related U.S. Application Data

(60) Provisional application No. 62/749,589, filed on Oct. 23, 2018.

(51) Int. Cl.
*A47J 36/06* (2006.01)
*A47J 36/24* (2006.01)
*B65D 43/20* (2006.01)

(52) U.S. Cl.
CPC ........... *A47J 36/06* (2013.01); *A47J 36/2405* (2013.01); *B65D 43/20* (2013.01)

(58) Field of Classification Search
CPC . A47J 36/06–12; A47J 36/2405; B65D 43/06; B65D 43/065; B65D 43/12; B65D 43/20
USPC .................................... 220/345.1–345.6, 350
See application file for complete search history.

(56) References Cited

U.S. PATENT DOCUMENTS 1,296,423 A * 3/1919 Neef ....................... A47J 27/10
                                                              220/345.2
1,493,478 A * 5/1924 Dake ....................... A21B 3/133
                                                              220/366.1
2,107,997 A * 2/1938 Horsley ................ A45C 13/16
                                                              312/297
2,118,099 A * 5/1938 Mirk ....................... A47J 36/06
                                                              220/345.5
2,126,518 A * 8/1938 Vodinelich ............. A47J 36/06
                                                              160/133

(Continued)

FOREIGN PATENT DOCUMENTS

KR         0129524 Y1 * 12/1998 ........... B65D 43/164

*Primary Examiner* — John J Norton
(74) *Attorney, Agent, or Firm* — The Iwashko Law Firm, PLLC; Lev Ivan Gabriel Iwashko

(57) ABSTRACT

A chafing dish, including a basin including a well to store items therein, the basin comprising a lower groove forming portion disposed on at least a portion of the basin, a retractable lid disposed on at least a portion of a top surface of the basin to retract to an open position to open access to the well, and to expand to a closed position to close access to the well, the retractable lid including a body to cover the well when the retractable lid is in the closed position, an edge side disposed at a first end of the retractable lid to contact a first side of the top surface of the basin, and a weighted bar disposed at a second end of the retractable lid to slide toward the edge side to open access to the well and to slide away from the edge side to close access to the well, a top rim to cover at least a portion of an outer surface of the retractable lid, the top rim comprising an upper groove-forming portion to be affixed to the lower groove-forming portion to create bar-sliding grooves disposed at side portions of the basin to receive respective ends of the weighted bar therein to allow the weighted bar to slide within the bar-sliding grooves toward and away from the edge side.

14 Claims, 16 Drawing Sheets

(56) References Cited

U.S. PATENT DOCUMENTS

| | | | | |
|---|---|---|---|---|
| 3,737,066 A * | 6/1973 | Ames | ............. | B65D 47/0876 |
| | | | | 220/837 |
| 4,153,045 A * | 5/1979 | Phelon | ............. | A47J 37/101 |
| | | | | 126/381.1 |
| 4,162,024 A * | 7/1979 | Shanley | ............. | B65D 43/20 |
| | | | | 217/62 |
| 6,540,098 B1 * | 4/2003 | Jarvis | ............. | B65D 43/022 |
| | | | | 220/254.1 |
| 6,883,852 B2 * | 4/2005 | Laskey | ............. | B60N 3/102 |
| | | | | 220/350 |
| 2016/0114941 A1 * | 4/2016 | White | ............. | B65D 43/0222 |
| | | | | 29/434 |
| 2017/0334613 A1 * | 11/2017 | Angeloni | ............. | B65D 43/161 |

* cited by examiner

CHAFING DISH HAVING RETRACTABLE COVER AND LID THEREFOR

CROSS REFERENCE TO RELATED APPLICATION

This application claims the benefit of, and incorporates by reference, U.S. provisional patent application Ser. No. 62/749,589, entitled "Chafing Dish Having Retractable Cover and Lid Therefor," which was filed on Oct. 23, 2018.

BACKGROUND

1. Field

The present general inventive concept relates generally to a chafing dish, and particularly, to a chafing dish having retractable cover and a lid therefor.

2. Description of the Related Art

In many social gatherings where food is either brought or served, a wide variety of containers are used to transport and store the food. One such container is a chafing dish.

Typically, people who use a chafing dish in a social gathering use cellophane wrap or some aluminum foil to cover the dish. Unfortunately, these covers often stay open or tear easily, which keeps the food exposed to the elements or contamination from animals. In particular, flies may be the most common animals to contaminate food. Contaminated food can be harmful, if people who eat from it become ill due to food poisoning.

Therefore, there is a need for a dish cover that closes easily and prevents food in the chafing dish from being exposed to animals and the elements.

SUMMARY

The present general inventive concept provides a chafing dish having retractable cover.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a chafing dish, including a basin including a well to store items therein, the basin comprising a lower groove forming portion disposed on at least a portion of the basin, a retractable lid disposed on at least a portion of a top surface of the basin to retract to an open position to open access to the well, and to expand to a closed position to close access to the well, the retractable lid including a body to cover the well when the retractable lid is in the closed position, an edge side disposed at a first end of the retractable lid and affixed to a first side of the top surface of the basin, and a weighted bar disposed at a second end of the retractable lid to slide toward the edge side to open access to the well and to slide away from the edge side to close access to the well, a top rim to cover at least a portion of an outer surface of the retractable lid, the top rim comprising an upper groove-forming portion to be affixed to the lower groove-forming portion to create bar-sliding grooves disposed at side portions of the basin to receive respective ends of the weighted bar therein to allow the weighted bar to slide within the bar-sliding grooves toward and away from the edge side.

The body of the retractable lid may be transparent to allow a user to view the items stored within the well when the retractable lid is closed.

The first side of the top surface of the basin may include at least one peg to extend perpendicularly away from the first side of the top surface of the basin.

The edge side may include at least one aperture to receive the at least one peg therein to affix the edge side to the first side of the top surface of the basin.

The body of the retractable lid may include at least one hinge to fold the body when the retractable lid is opened.

The foregoing and/or other features and utilities of the present general inventive concept may also be achieved by providing a chafing dish lid to cover a chafing dish, the chafing dish lid including a bottom rim to be placed on a top portion of the chafing dish, the bottom rim including an opening disposed at a center portion of the bottom rim, and a retractable lid disposed on at least a portion of a top surface of the bottom rim to retract to an open position to open access to the opening and to expand to a closed position to close access to the opening, the retractable lid including a body to cover the opening when the retractable lid is in the closed position, and an edge side disposed at a first end of the retractable lid and affixed to a first side of the top surface of the basin.

The retractable lid may further include a weighted bar disposed at a second end of the retractable lid to slide toward the edge side to open access to the opening and to slide away from the edge side to close access to the opening.

The lower rim may further include a lower groove forming portion disposed on at least a portion of a top surface of the bottom rim.

The chafing dish lid may further include a top rim to cover at least a portion of the retractable lid, the top rim including an upper groove forming portion to contact at least a portion of the lower groove forming portion to allow at least a portion of the retractable lid to slide laterally to open and close the opening.

The retractable lid may further include a weighted bar disposed at a second end of the retractable lid to slide along the lower groove forming portion toward the edge side to open access to the opening and to slide away from the edge side to close access to the opening.

The chafing dish lid may further include a top rim to cover at least a portion of the retractable lid, the top rim including an upper groove forming portion contact at least a portion of the lower groove forming portion to create a bar-sliding groove, such that the weighted bar is slidable therebetween.

The foregoing and/or other features and utilities of the present general inventive concept may also be achieved by providing a chafing dish lid to cover a chafing dish, the chafing dish lid including a bottom rim to be placed on a top portion of the chafing dish, a top rim to be placed atop the bottom rim, and a retractable lid having side portions disposed at least partially between the bottom rim and the top rim such that the retractable lid slides laterally between a first position in which access to the chafing dish is closed and a second position in which access to the chafing dish is opened.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
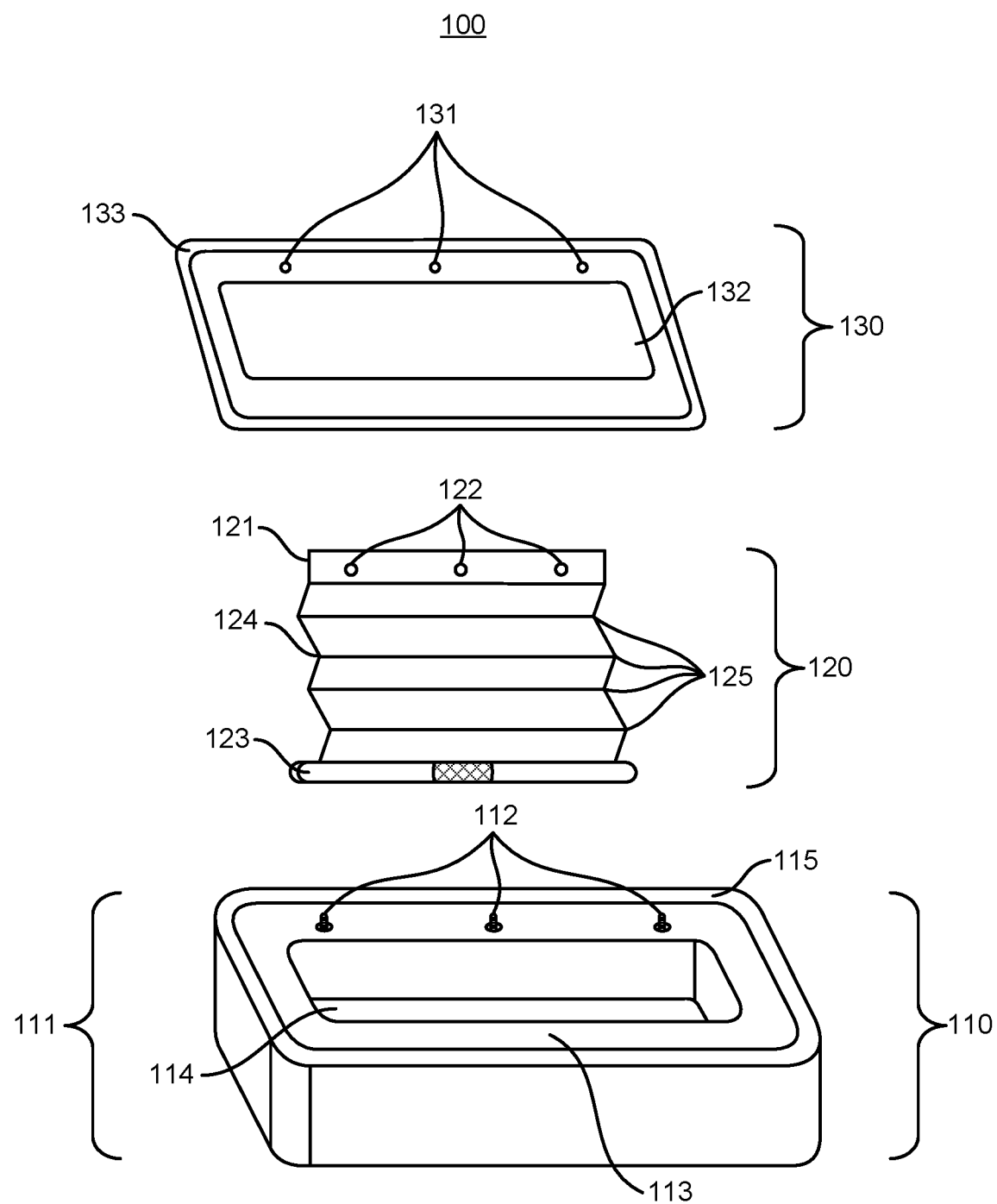
FIG. 1 illustrates an exploded side perspective view of a chafing dish having retractable cover, according to an exemplary embodiment of the present general inventive concept.

FIG. 1 illustrates an exploded side perspective view of a chafing dish 100 having retractable cover 120, according to an exemplary embodiment of the present general inventive concept.

The chafing dish 100 may include a basin 110, a retractable cover 120, and a top rim 130, but is not limited thereto. Although, the chafing dish 100 is illustrated in FIG. 1 to have a rectangular prism shape, the chafing dish 100 may be rectangular, circular, conical, spherical, or any feasible shape desired by a user. The chafing dish 100 may be constructed from at least one of aluminum, wood, plastic, stone, ceramic, closed-cell extruded polystyrene foam, etc., but is not limited thereto. Furthermore, the material used to construct the chafing dish 100 may be tempered to improve adaptation to changing temperatures.

The basin 110 may include a bottom rim 111, at least one peg 112, an upper portion 113, a well 114, and a lower groove-forming portion 115, but is not limited thereto.

The bottom rim 111 may be of a predetermined size larger than the basin 110, such that the bottom rim 111 may be affixed and/or adhered to the basin 110. The at least one peg 112 may extend at least partially above the upper portion 113, substantially perpendicular to the upper portion 113.

The at least one peg 112 may be disposed on the upper portion 113 along one side of the upper portion 113. Although, the at least one peg 112 is illustrated as a protrusion, the at least one peg 112 may also be at least one of a magnet, a Velcro strip, a zipper, etc., but is not limited thereto. The well 114 may fill the remainder of the shape of basin 110. The well 114 may be of varying volume within the basin 110. As such, the basin 110 may accommodate different amounts of food.

The retractable cover 120 may include an edge side 121, at least one cover hole 122, a weighted bar 123, a body 124, at least one hinge 125, and a handle 126, but is not limited thereto.

Referring to FIG. 1, the edge side 121 may have the at least one cover hole 122 disposed on at least a portion thereof. The at least one cover hole 122 may have a same number thereof corresponding to the at least one peg 112. The at least one cover hole 122 may be disposed on one side of the retractable cover 120, but may coincide with placement of the at least one peg 112. The at least one cover hole 122 may be placed onto the at least one peg 112 such that the retractable cover 120 may be affixed and/or adhered to a surface of the upper portion 113. The weighted bar 123 may be a rectangular tube or a circular tube in shape, may extend over the well 114, and may be placed on the lower groove-forming portion 115. The user may grasp the handle 126, such that the weighted bar 123 may be shifted to slide across the lower groove-forming portion 115 towards the end of the upper portion 113 with the at least one peg 112.

The body 124 may fold along the at least one hinge 125, multiple times, to create an accordion fold, half fold, tri-fold, z fold, roll fold, etc., but is not limited thereto. The body 124 may also fold along the at least one hinge 125, horizontally, vertically, diagonally, circularly, etc., but is not limited thereto. In this manner, the weighted bar 123 may be used to open and/or close access to any food within the basin 110. The body 124 may be transparent allowing the contents, such as food, of the well 114 to be viewed therethrough.

The top rim 130 may include at least one rim hole 131, an opening 132, and an upper groove-forming portion 133. The top rim 130 may be substantially flat in structure.

Referring to FIG. 1, the at least one cover hole 122 may be disposed on one side of the retractable cover 120, but may coincide with placement of the at least one peg 112. The at least one rim hole 131 may be placed onto the at least one peg 112 such that the top rim 130 may be affixed and/or adhered to the surface of the upper portion 113. As such, the top rim 130 and the basin 110 may be removably connected. Subsequently, the lower groove-forming portion 115 and the upper groove-forming portion 133 may be joined to create a space called a bar-sliding groove (not illustrated). The bar-sliding groove allows the weighted bar 123 to slide between the lower groove-forming portion 115 and the upper groove-forming portion 133, as the user desires. The opening 132 may allow the user to access the retractable cover 120.

Figure 2:
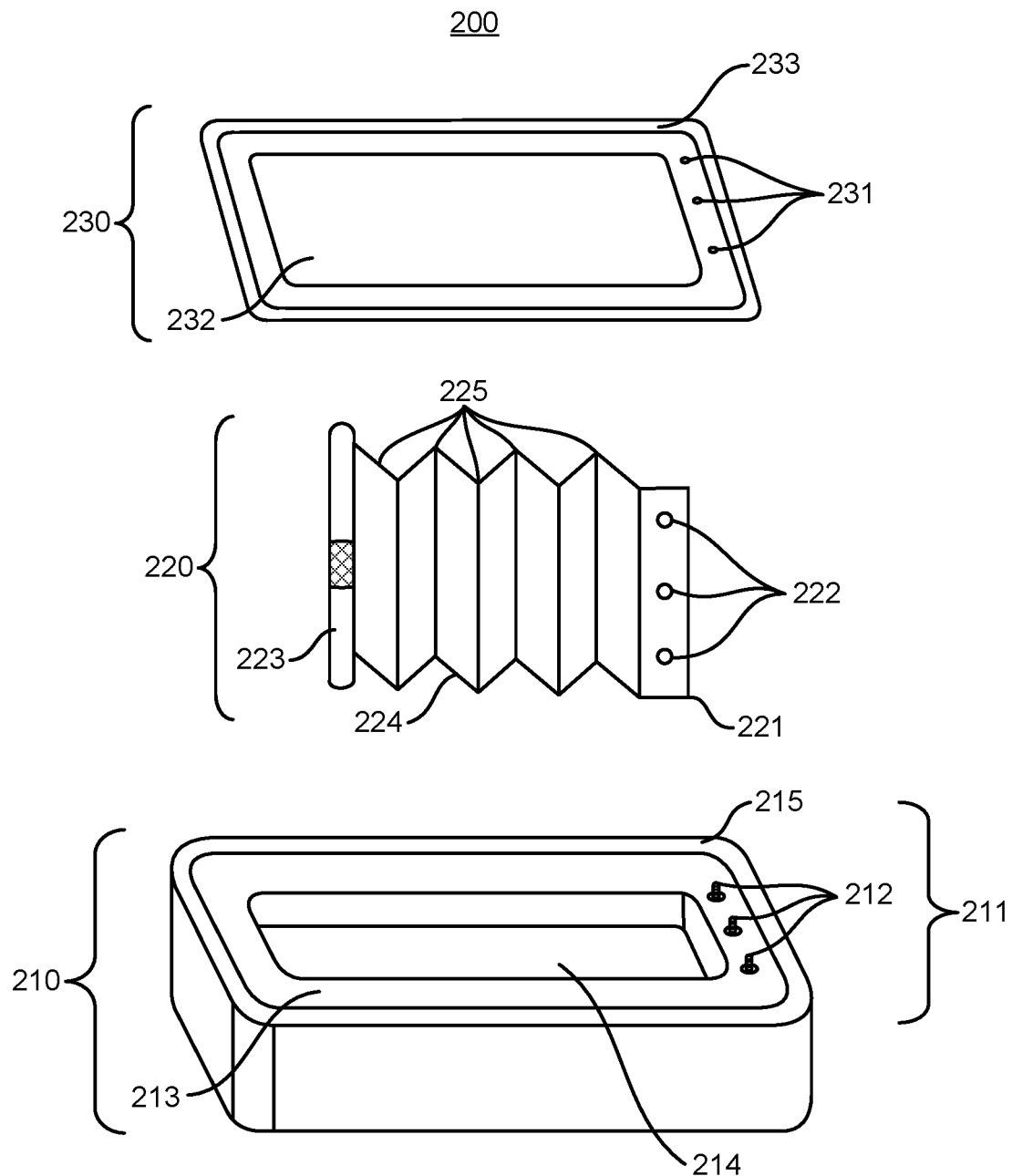
FIG. 2 illustrates an exploded side perspective view of a chafing dish having retractable cover, according to another exemplary embodiment of the present general inventive concept.

FIG. 2 illustrates an exploded side perspective view of a chafing dish 200 having retractable cover 220, according to another exemplary embodiment of the present general inventive concept.

The chafing dish 200 may include a basin 210, a retractable cover 220, and a top rim 230, but is not limited thereto. Although, the chafing dish 200 is illustrated in FIG. 2 to have a rectangular prism shape, the chafing dish 200 may be rectangular, circular, conical, spherical, or any feasible shape desired by a user. The chafing dish 200 may be constructed from at least one of aluminum, wood, plastic, stone, ceramic, closed-cell extruded polystyrene foam, etc., but is not limited thereto. Furthermore, the material used to construct the chafing dish 200 may be tempered to improve adaptation to changing temperatures.

The basin 210 may include a bottom rim 211, at least one peg 213, an upper portion 214, a well 215, and a lower groove-forming portion 215, but is not limited thereto.

The bottom rim 211 may be of a predetermined size larger than the basin 210, such that the bottom rim 211 may be affixed and/or adhered to the basin 210. The at least one peg 212 may extend at least partially above the upper portion 213, substantially perpendicular to the upper portion 213. The at least one peg 212 may be disposed on the upper portion 213 along one side of the upper portion 213. Although, the at least one peg 212 is illustrated as a protrusion, the at least one peg 212 may also be at least one of a magnet, a Velcro strip, a zipper, etc., but is not limited thereto. The well 214 may fill the remainder of the shape of basin 210. The well 214 may be of varying volume within the basin 210. As such, basin 210 may accommodate different amounts of food.

The retractable cover 220 may include an edge side 221, at least one cover hole 222, a weighted bar 223, a body 224, at least one hinge 225, and a handle 226, but is not limited thereto.

Referring to FIG. 2, the edge side 221 may have the at least one cover hole 222 disposed on at least a portion thereof. The at least one cover hole 222 may have a same number thereof corresponding to the at least one peg 212. The at least one cover hole 222 may be disposed on one side of the retractable cover 220, but may coincide with placement of the at least one peg 212. The at least one cover hole 222 may be placed onto the at least one peg 212 such that the retractable cover 220 may be affixed and/or adhered to a surface of the upper portion 213. The weighted bar 223 may be a rectangular tube or a circular tube in shape, may extend over the well 214, and may be placed on the lower groove-forming portion 215. The user may grasp the handle 226, such that the weighted bar 223 may be shifted to slide across the lower groove-forming portion 215 towards the end of the upper portion 213 with the at least one peg 212.

The body 224 may fold along the at least one hinge 225, multiple times, to create an accordion fold, half fold, tri-fold, z fold, roll fold, etc., but is not limited thereto. The body 224 may also fold along the at least one hinge 225, horizontally, vertically, diagonally, circularly, etc., but is not limited thereto. In this manner, the weighted bar 223 may be used to open and/or close access to any food within the basin 210. The body 224 may be transparent allowing the contents of the well 214 to be viewed therethrough.

The top rim 230 may include at least one rim hole 231, an opening 232, and an upper groove-forming portion 233. The top rim 230 may be substantially flat in structure.

Referring to FIG. 2, the at least one cover hole 222 may be disposed on one side of the retractable cover 220, but may coincide with placement of the at least one peg 212. The at least one rim hole 231 may be placed onto the at least one peg 212 such that the top rim 230 may be affixed and/or adhered to the surface of the upper portion 213. As such, the top rim 230 and the basin 210 may be removably connected. Subsequently, the lower groove-forming portion 215 and the upper groove-forming portion 233 may be joined to create the bar-sliding groove (not illustrated). The bar-sliding groove allows the weighted bar 223 to slide between the basin 210 and the top rim 230, as a user desires. The opening 232 may allow the user to access the retractable cover 220.

Figure 3:
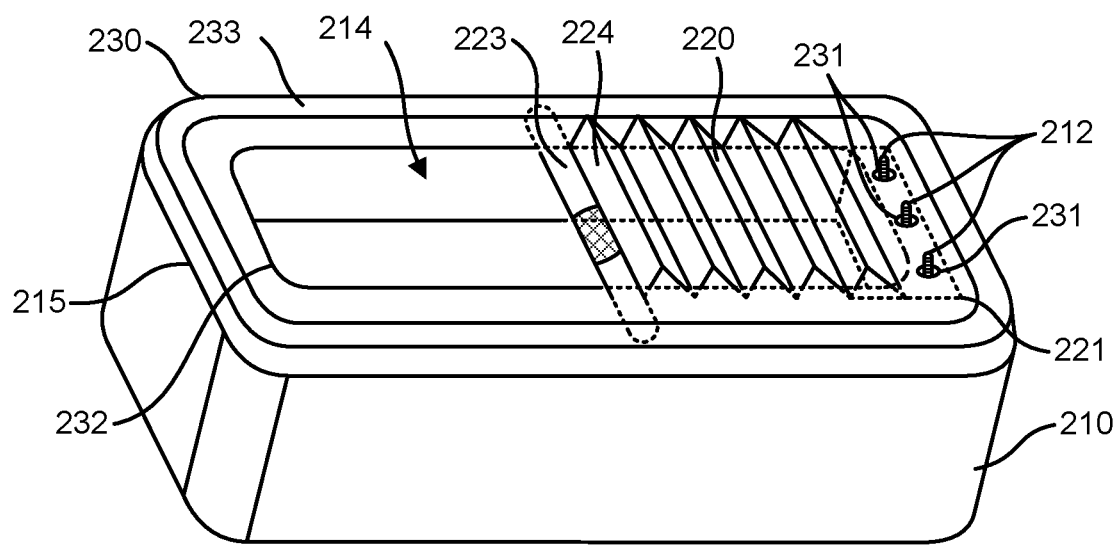
FIG. 3 illustrates an isometric view of a chafing dish having retractable cover, according to another exemplary embodiment of the present general inventive concept.

FIG. 3 illustrates an isometric view of a chafing dish 200 having retractable cover 220, according to another exemplary embodiment of the present general inventive concept.

Referring to FIG. 3, the chafing dish 200 may have the at least one rim hole 231 such that it may be placed onto the at least one peg 212 such that the top rim 230 may be affixed and/or adhered to the basin 210. As such, the top rim 230 and the basin 210 may be removably connected. Subsequently, the lower groove-forming portion 215 and the upper groove-forming portion 233 may be joined to create the bar-sliding groove (not illustrated). The bar-sliding groove allows the weighted bar 223 to slide between the lower groove-forming portion 215 and the upper groove-forming portion 233, as the user desires. The opening 232 may allow the user to access the retractable cover 220.

Figure 4:
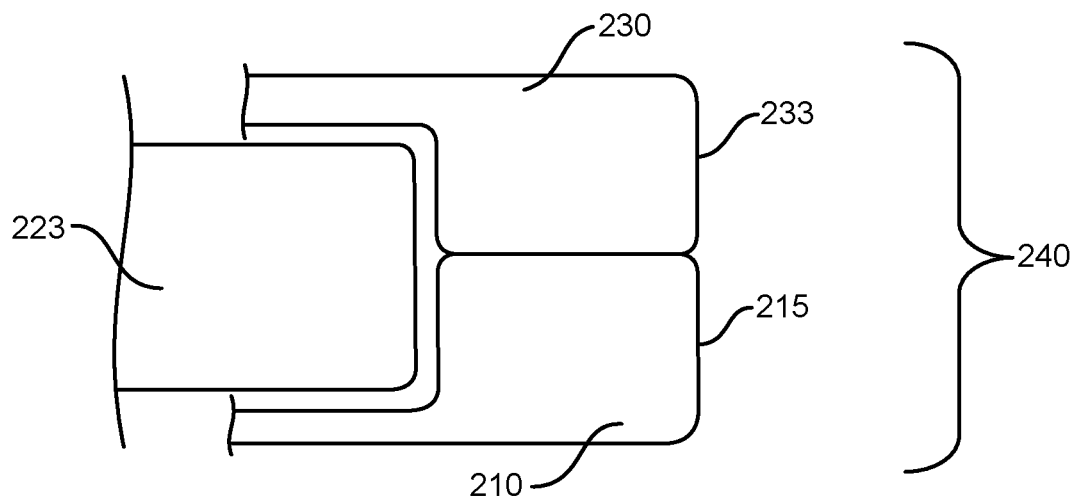
FIG. 4 illustrates a zoomed in view of a bar-sliding groove, according to another exemplary embodiment of the present general inventive concept.

FIG. 4 illustrates a zoomed in view of a bar-sliding groove 240, according to another exemplary embodiment of the present general inventive concept.

Referring to FIG. 4, the lower groove-forming portion 215, of the basin 210, and the upper groove-forming portion 233, of the top rim 230, of the chafing dish 200 may be joined to create the bar-sliding groove 240. The bar-sliding groove 240 allows the weighted bar 223 to slide between the lower groove-forming portion 215 and the upper groove-forming portion 233, as the user desires.

Figure 5:
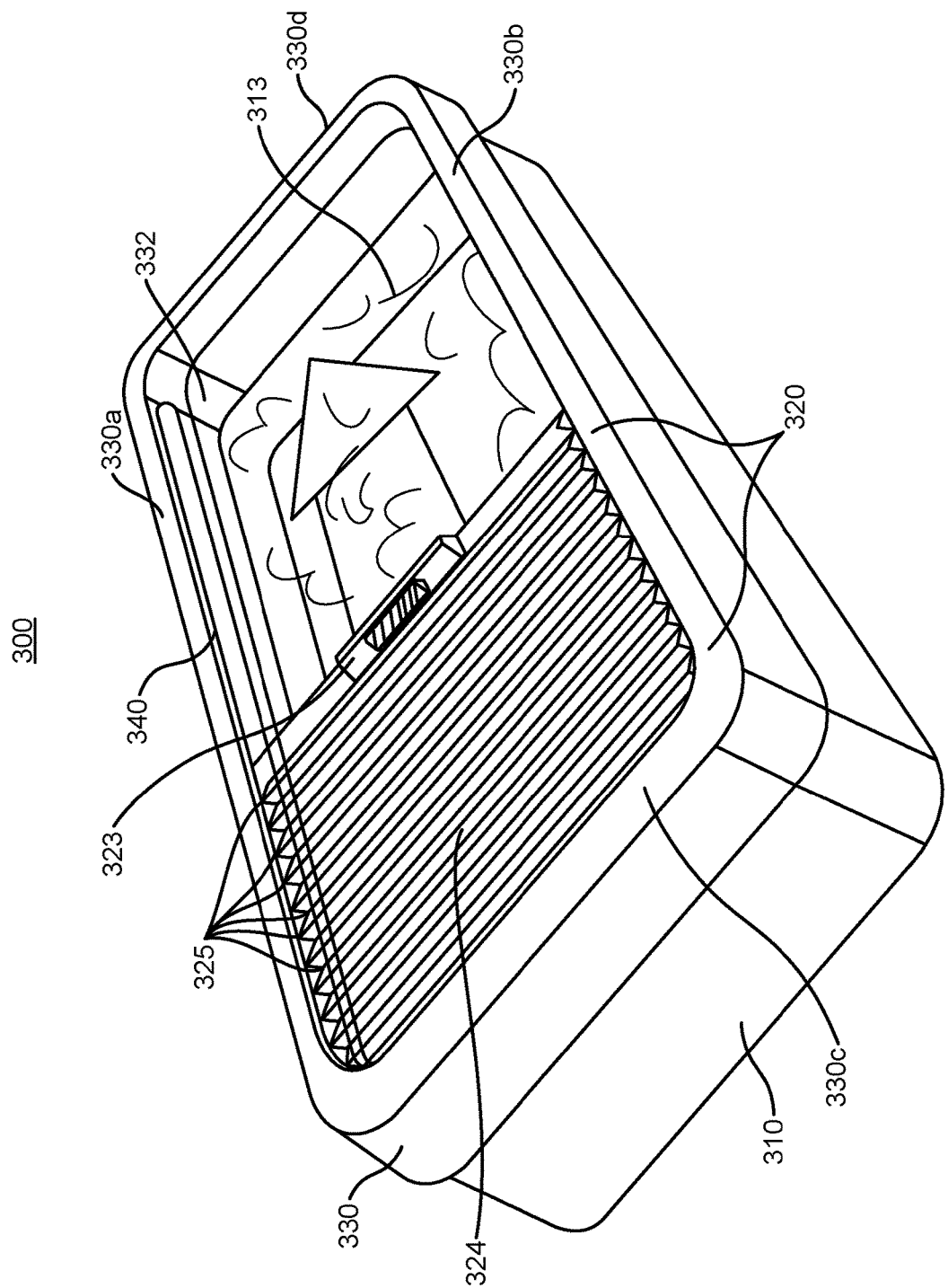
FIG. 5 illustrates an isometric top perspective view of a chafing dish having retractable cover, according to another exemplary embodiment of the present general inventive concept.

FIG. 5 illustrates an isometric top perspective view of a chafing dish 300 having retractable cover 320, according to another exemplary embodiment of the present general inventive concept.

The chafing dish 300 may include a basin 310, a retractable cover 320, and a top rim 330, but is not limited thereto.

Although, the chafing dish 300 is illustrated in FIG. 5 to be rectangular prism shaped, the chafing dish 300 may be rectangular, circular, conical, spherical, or any feasible shape desired by a user. The chafing dish 300 may be constructed from at least one of aluminum, wood, plastic, stone, ceramic, closed-cell extruded polystyrene foam, etc., but is not limited thereto. Furthermore, the material used to construct the chafing dish 300 may be tempered to improve adaptation to changing temperatures.

The basin 310 may include a well 313, but is not limited thereto.

The well 313 may fill a shape of the basin 310. The well 313 may be of varying volume within the basin 310. As such, basin 310 may accommodate different amounts of food.

The top rim 330 may include a first side 330a, a second side 330b, a third side 330c, a fourth side 330d, the retractable cover 320, an opening 332, and at least one bar-sliding groove 340, but is not limited thereto. The top rim 330 may be substantially flat in structure.

The first side 330a may be substantially parallel to the second side 330b, and the third side 330c may be substantially parallel to the fourth side 330d.

The top rim 330 in FIG. 5 is illustrated to include the first side 330a and the second side 330b as being longer than the third side 330c and the fourth side 330d, but the present general inventive concept is not limited thereto, and the third side 330c and the fourth side 330d may be longer than the first side 330a and the second side 330b (or all the sides 330a-d may have equal lengths).

Referring to FIG. 5, at least a portion of the top rim 330 may be of a predetermined size, larger than the basin 310, such that the top rim 330 may be affixed and/or adhered to the basin 310. As such, the top rim 330 and the basin 310 may be removably connected. The at least one bar-sliding groove 340 may be disposed within at least a portion of the top rim 330 in the first side 330a and the second side 330b. Alternatively, the at least one bar sliding groove 340 may be disposed within at least a portion of the third side 330c and the fourth side 330d. The opening 332 may allow the user to access the retractable cover 320.

The retractable cover 320 may include a weighted bar 323, a body 324, at least one hinge 325, and a handle 326, but is not limited thereto.

The at least one bar-sliding groove 340 may receive at least a portion of the weighted bar 323 therein to slide within the top rim 330, as a user desires, thereby opening and closing the well 313.

Referring to FIG. 5, the weighted bar 323 may be a rectangular tube or a circular tube in shape, may extend a distance over the well 313, and may be disposed within the bar-sliding groove 340. The user may grasp the handle 326, such that the weighted bar 323 may be shifted to slide across the top rim 330 from the third side 330c across the opening 332 to the fourth side 330d. However, the top rim 330 may be adapted such that the weighted bar 323 may be opened or closed in the opposite direction. In other words, the retractable cover 320 may be disposed within the top rim 330 such that the weighted bar 323 closes by sliding across the top rim 330 from the fourth side 330d to the third side 330c, but is not limited thereto.

The body 324 may fold along the at least one hinge 325, multiple times, to create an accordion fold, half fold, tri-fold, z fold, roll fold, etc., but is not limited thereto. The body 324 may also fold along the at least one hinge 325, horizontally, vertically, diagonally, circularly, etc., but is not limited thereto. In this manner, the weighted bar 323 may be used to open or close access to any food within the basin 310. The body 324 may be transparent allowing the contents, such as food, of the well 313 to be viewed.

Figure 6:
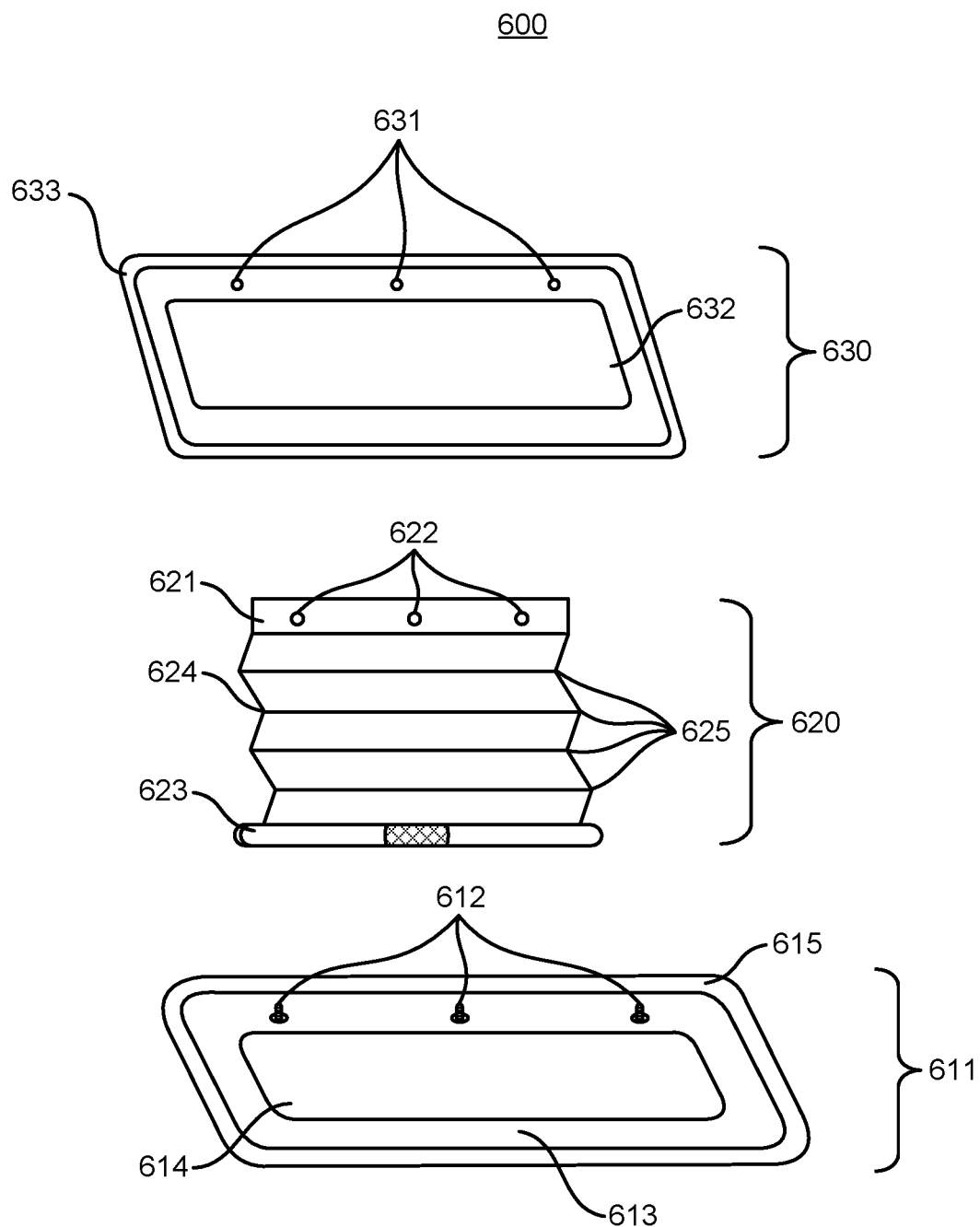
FIG. 6 illustrates an exploded side perspective view of a chafing dish lid having retractable cover, according to another exemplary embodiment of the present general inventive concept.

FIG. 6 illustrates an exploded side perspective view of a chafing dish lid 600 having retractable cover 620, according to another exemplary embodiment of the present general inventive concept.

The chafing dish lid 600 may include a bottom rim 611, a retractable cover 620, and a top rim 630, but is not limited thereto.

Although, the chafing dish lid 600 is illustrated in FIG. 6 to have a rectangular prism shape, the chafing dish lid 600 may be rectangular, circular, conical, spherical, or any feasible shape desired by a user. The chafing dish lid 600 may be constructed from at least one of aluminum, wood, plastic, stone, ceramic, closed-cell extruded polystyrene foam, etc., but is not limited thereto. Furthermore, the material used to construct the chafing dish lid 600 may be tempered to improve adaptation to changing temperatures.

The bottom rim 611 may include at least one peg 612, an upper portion 613, a well 614, and a lower groove-forming portion 615, but is not limited thereto.

The at least one peg 612 may extend at least partially above the upper portion 613, substantially perpendicular to the upper portion 613. The at least one peg 612 may be disposed on the upper portion 613 along one side of the upper portion 613. Although, the at least one peg 612 is illustrated as a protrusion, the at least one peg 612 may also be at least one of a magnet, a Velcro strip, a zipper, etc., but is not limited thereto.

The retractable cover 620 may include an edge side 621, at least one cover hole 622, a weighted bar 623, a body 624, at least one hinge 625, and a handle 626, but is not limited thereto.

Referring to FIG. 6, the edge side 621 may have the at least one cover hole 622 disposed on at least a portion thereof. The at least one cover hole 622 may have a same number thereof corresponding to the at least one peg 612. The at least one cover hole 622 may be disposed on one side of the retractable cover 620, but may coincide with placement of the at least one peg 612. The at least one cover hole 622 may be placed onto the at least one peg 612 such that the retractable cover 620 may be affixed and/or adhered to a surface of the upper portion 613. The weighted bar 623 may be a rectangular tube or a circular tube in shape, may extend a distance over the well 614, and may be placed on the lower groove-forming portion 615. The user may grasp the handle 626, such that the weighted bar 623 may be shifted to slide across the lower groove-forming portion 615 towards the end of the upper portion 613 with the at least one peg 612.

The body 624 may fold along the at least one hinge 625, multiple times, to create an accordion fold, half fold, tri-fold, z fold, roll fold, etc., but is not limited thereto. The body 624 may also fold along the at least one hinge 625, horizontally, vertically, diagonally, circularly, etc., but is not limited thereto. The body 624 may be transparent.

The top rim 630 may include at least one rim hole 631, an opening 632, and an upper groove-forming portion 633, but is not limited thereto. The top rim 630 may be substantially flat in structure.

Referring to FIG. 6, the at least one cover hole 622 may be disposed on one side of the retractable cover 620, but may coincide with placement of the at least one peg 612. The at least one rim hole 631 may be placed onto the at least one peg 612 such that the top rim 630 may be affixed and/or adhered to the surface of the upper portion 613. As such, the top rim 630 and the bottom rim 611 may be merged. Subsequently, the lower groove-forming portion 615 and the upper groove-forming portion 633 may be joined to create a space called a bar-sliding groove (not illustrated). The bar-sliding groove allows the weighted bar 623 to slide between the lower groove-forming portion 615 and the upper groove-forming portion 633, as a user desires. The opening 632 may allow the user to access the retractable cover 620.

The chafing dish lid 600 may have any size, and thus, may be inserted onto any chafing dish desired by the user.

Figure 7:
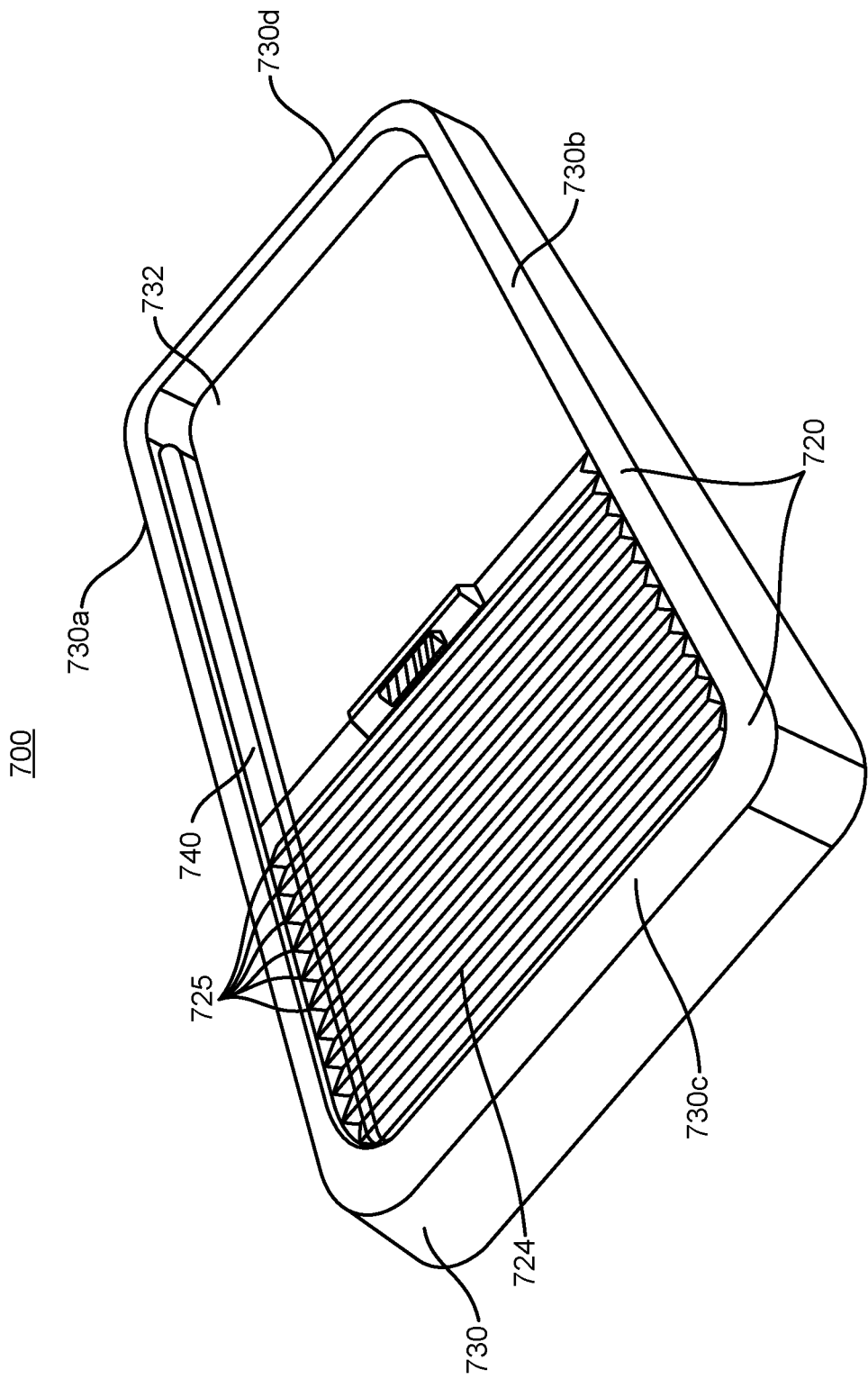
FIG. 7 illustrates an isometric top perspective view of a chafing dish lid having retractable cover, according to another exemplary embodiment of the present general inventive concept.

FIG. 7 illustrates an isometric top perspective view of a chafing dish lid 700 having retractable cover 720, according to another exemplary embodiment of the present general inventive concept.

The chafing dish lid 700 may include the retractable cover 720 and a top rim 730, but is not limited thereto.

Although, the chafing dish lid 700 is illustrated in FIG. 7 to be rectangular prism shaped, the chafing dish lid 700 may be rectangular, circular, conical, spherical, or any feasible shape desired by a user. The chafing dish lid 700 may be constructed from at least one of aluminum, wood, plastic, stone, ceramic, closed-cell extruded polystyrene foam, etc., but is not limited thereto. Furthermore, the material used to construct the chafing dish lid 700 may be tempered to improve adaptation to changing temperatures.

The top rim 730 may include a first side 730a, a second side 730b, a third side 730c, a fourth side 730d, the retractable cover 720, an opening 732, and at least one bar-sliding groove 740, but is not limited thereto. The top rim 730 may be substantially flat in structure.

The first side 730a may be substantially parallel to the second side 730b, and the third side 730c may be substantially parallel to the fourth side 730d.

The top rim 730 in FIG. 7 is illustrated to include the first side 730a and the second side 730b as being longer than the third side 730c and the fourth side 730d, but the present general inventive concept is not limited thereto, and the third side 730c and the fourth side 730d may be longer than the first side 730a and the second side 730b (or all the sides 730a-d may have equal lengths).

Referring to FIG. 7, the at least one bar-sliding groove 740 may be disposed within the top rim 730 in the first side 730a and the second side 730b. Alternatively, the at least one bar sliding groove 740 may be disposed within the third side 730c and the fourth side 730d. The opening 732 may allow the user to access the retractable cover 720.

The retractable cover 720 may include a weighted bar 723, a body 724, at least one hinge 725, and a handle 726, but is not limited thereto.

The at least one bar-sliding groove 740 may allow the weighted bar 723 to slide within the top rim 730, as a user desires.

Referring to FIG. 7, the weighted bar 723 may be a rectangular tube or a circular tube in shape. Additionally, the weighted bar 723 may extend a distance over the opening 732, and may be disposed within at least a portion of the bar-sliding groove 740. The user may grasp the handle 726, such that the weighted bar 723 may be shifted to slide across the top rim 730 from the third side 730c across the opening 732 to the fourth side 730d. However, the top rim 730 may be adapted such that the weighted bar 723 may be opened or closed in the opposite direction. In other words, the retractable cover 720 may be disposed within the top rim 730 such that the weighted bar 723 closes by sliding across the top rim 730 from the fourth side 730d to the third side 730c, but is not limited thereto.

The body 724 may fold along the at least one hinge 725, multiple times, to create an accordion fold, half fold, tri-fold, z fold, roll fold, etc., but is not limited thereto. The body 724 may also fold along the at least one hinge 725, horizontally, vertically, diagonally, circularly, etc., but is not limited thereto. The body 724 may be transparent.

The chafing dish lid 700 may have any size, and thus, may be inserted onto any chafing dish desired by the user.

Figure 8A:
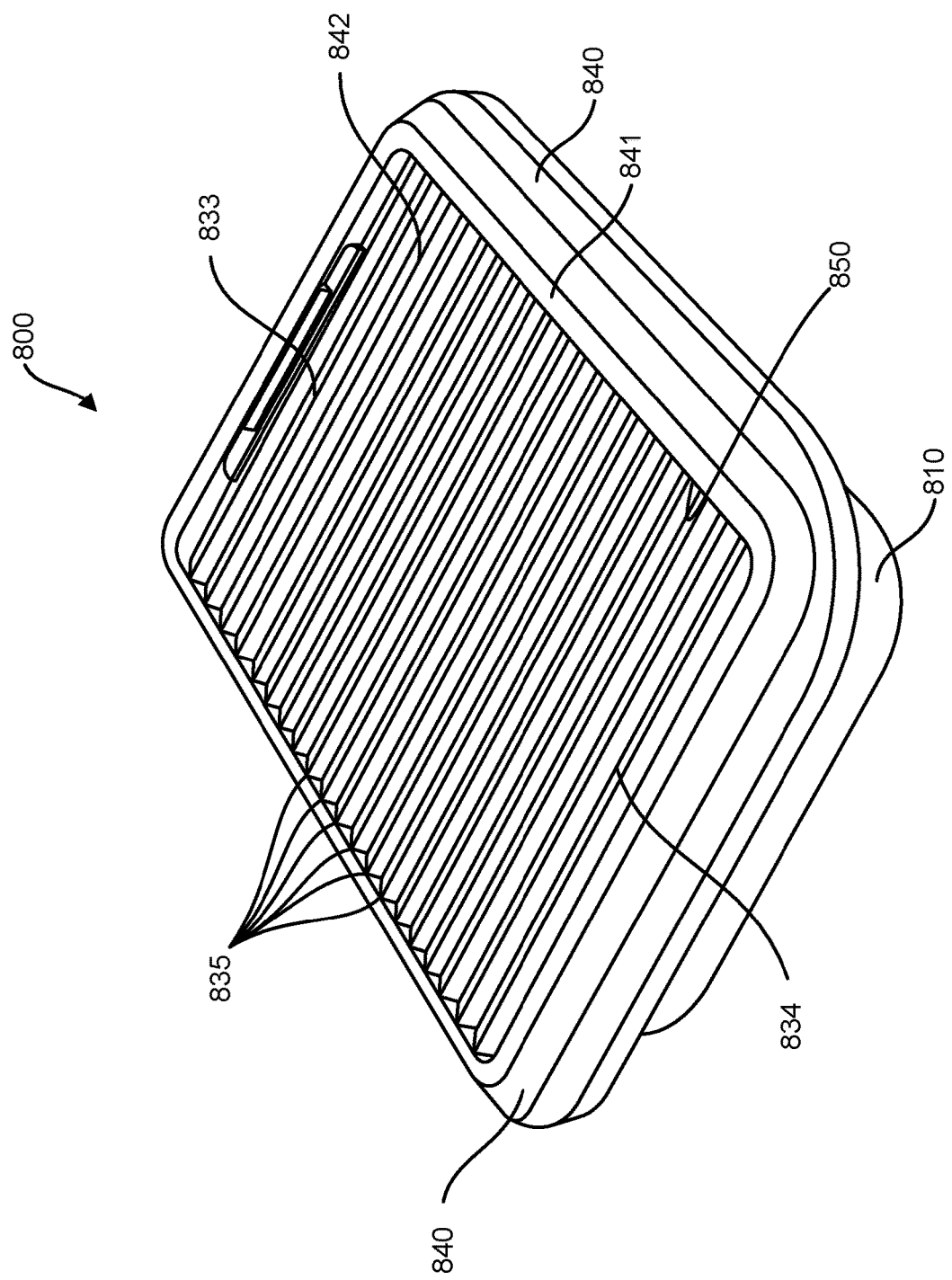
FIG. 8A illustrates an isometric view of a chafing dish having retractable cover in a closed position, according to another exemplary embodiment of the present general inventive concept.

FIG. 8A illustrates an isometric view of a chafing dish 800 having retractable cover 830 in a closed position, according to another exemplary embodiment of the present general inventive concept.

Figure 8B:
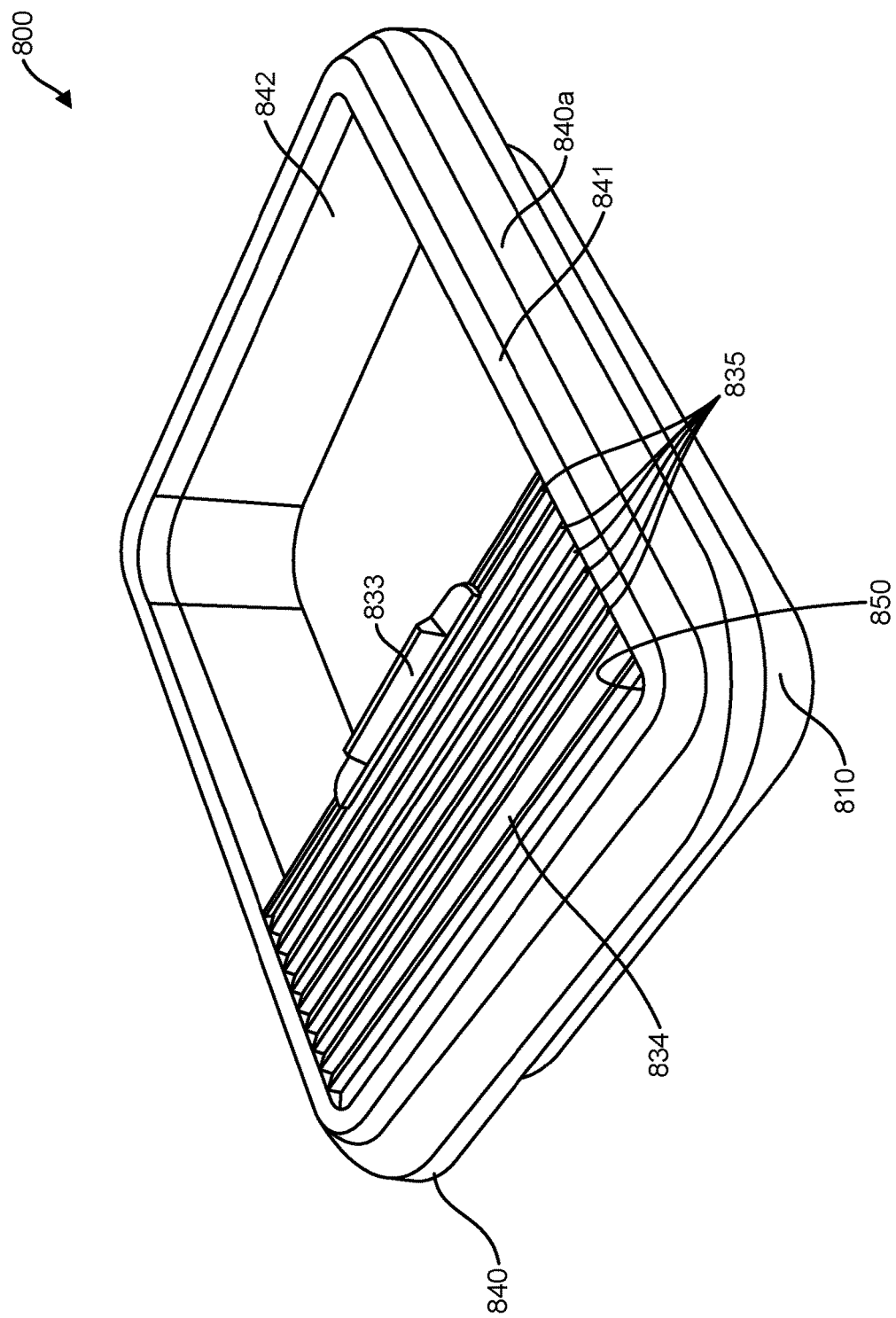
FIG. 8B illustrates an isometric view of the chafing dish having retractable cover in a closed position, according to another exemplary embodiment of the present general inventive concept.

FIG. 8B illustrates an isometric view of the chafing dish 800 having retractable cover 830 in a closed position, according to another exemplary embodiment of the present general inventive concept.

Figure 8C:
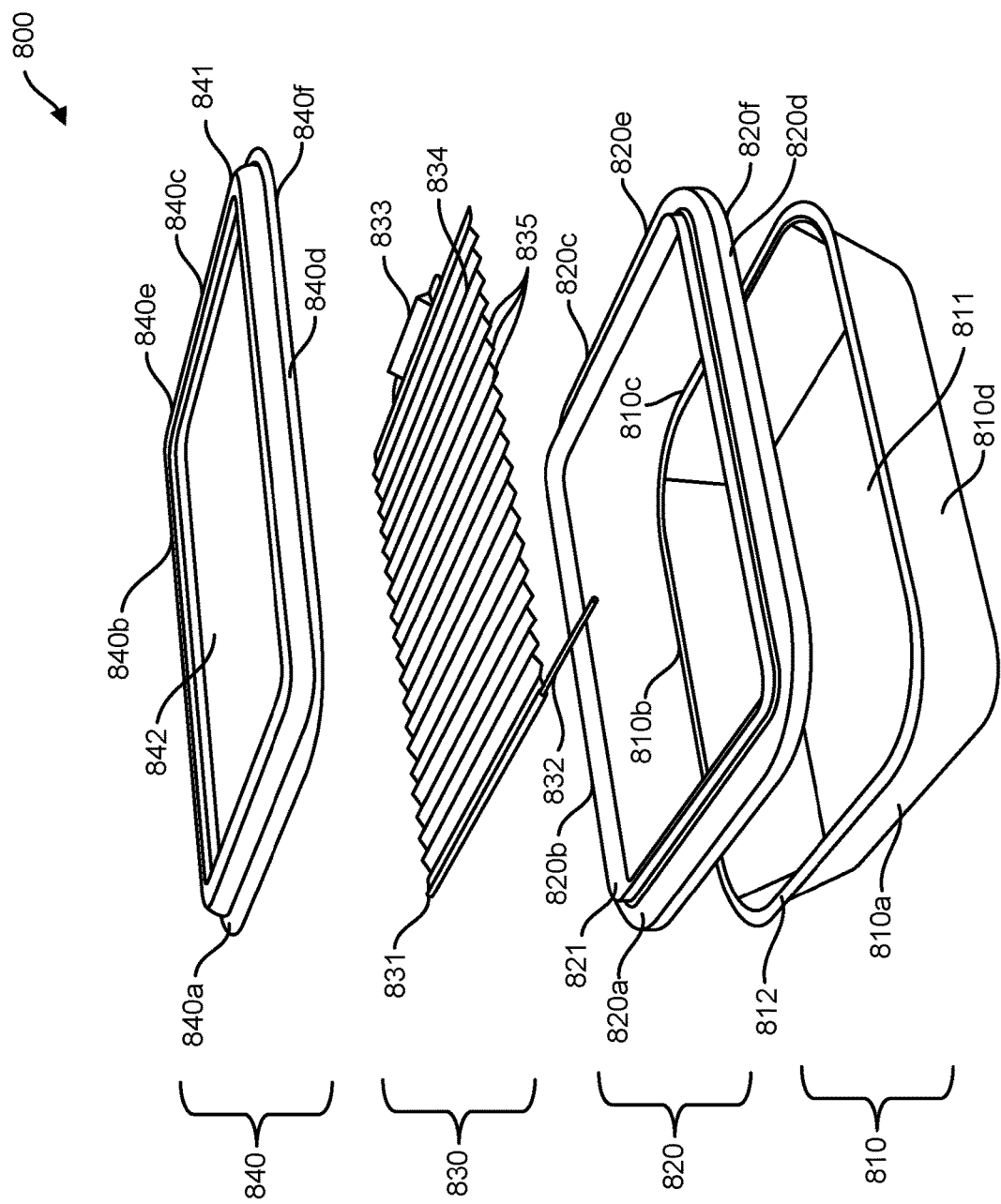
FIG. 8C illustrates an exploded view of the chafing dish having retractable cover, according to another exemplary embodiment of the present general inventive concept.

FIG. 8C illustrates an exploded view of the chafing dish 800 having retractable cover 830, according to another exemplary embodiment of the present general inventive concept.

The chafing dish 800 may include a basin 810, a bottom rim 820, a retractable cover 830, and a top rim 840, but is not limited thereto.

Although, the chafing dish 800 is illustrated in FIGS. 8A through 8C to have a rectangular prism shape, the chafing dish 800 may be rectangular, circular, conical, spherical, or any feasible shape desired by the user. The chafing dish 800 may be constructed from at least one of aluminum, wood, plastic, stone, ceramic, closed-cell extruded polystyrene foam, etc., but is not limited thereto. Furthermore, the material used to construct the chafing dish 800 may be tempered to improve adaptation to changing temperatures.

Referring to FIG. 8C, the basin 810 may include a first side 810a, a second side 810b, a third side 810c, a fourth side 810d, a base 811 and a lip portion 812, but is not limited thereto.

The first side 810a, the second side 810b, the third side 810c, and the fourth side 810d (collectively, all four sides of the basin 810) may surround the base 811. The lip portion 812 may be disposed on a top portion of all four sides of the basin. The basin 810 may vary in volume. As such, the basin 810 may accommodate different amounts of food.

Referring to FIG. 8C, the bottom rim 820 may include a first side 820a, a second side, 820b, a third side, 820c, a fourth side 820d, a fifth side 820e, a sixth side 820f, and a ridge 821, but is not limited thereto.

The first side 820a, the second side 820b, the third side 820c, and the fourth side 820d (collectively, all four sides of the bottom rim 820) may extend a lateral distance outward greater than a lateral distance of the lip portion 812 of the basin 810 extends outward. The bottom rim 820 may be removably affixed and/or adhered to the basin 810. Specifically, the first side 820a, the second side 820b, the third side 820c, and the fourth side 820d may be affixed and/or adhered to the corresponding same sides of the basin 810 by directing the sixth side 820f toward the lip portion 812. In other words, the bottom rim 820 may be affixed and/or adhered to the basin 810 by snapping on the bottom rim 820 corresponding to the lip portion 812 of the basin 810. Alternatively, the bottom rim 820 may be affixed and/or adhered to the lip portion 812 of the basin 810 by a magnet, a Velcro strip, a zipper, etc., but is not limited thereto. The ridge 821 may be disposed on at least a portion of the fifth side 820e. The sixth side 820f of the ridge 821 corresponds to at least a portion of the sixth side 820f that may be affixed and/or adhered to the lip portion 812.

The retractable cover 830 may include an edge side 831, an attachment rod 832, a weighted bar 833, a body 834, at least one hinge 835, and a handle 836, but is not limited thereto.

The retractable cover 830 may be disposed within at least a portion of the ridge 821. Specifically, the edge side 831 may be disposed within at least a portion of the ridge 821 near the first side 820a of the bottom rim 820. Alternatively, the edge side 831 may be disposed within at least a portion of the ridge 821 near the third side 820c of the bottom rim 820. The attachment rod 832 may affix and/or adhere the retractable cover 830 to the bottom rim 820.

The top rim 840 may include a first side 840a, a second side 840b, a third side 840c, a fourth side 840d, a fifth side 840e, a sixth side 840f, a ridge 841, and an opening 842, but is not limited thereto.

The first side 840a may be substantially parallel to the third side 840c, and the second side 840b may be substantially parallel to the fourth side 840d.

The top rim 840 in FIG. 8C is illustrated to include the second side 840b and the fourth side 840d as being longer than the first side 840a and the third side 840c, but is not limited thereto. Alternatively, the first side 840a and the third side 840c may be longer than the second side 840b and the fourth side 840d (or all the sides 840a-d may have equal lengths).

The first side 840a, the second side 840b, the third side 840c, and the fourth side 840d (collectively, all four sides of the top rim 840) may extend a lateral distance outward at least partially greater than the lateral distance all four sides of the bottom rim 820 extend outward. The fifth side 840e may be directed outward away from the basin 810. The top rim 840 may be removably affixed and/or adhered to the bottom rim 820. Specifically, all four sides of the top rim 840 may be affixed and/or adhered to the corresponding all four sides of the bottom rim 820 by directing the sixth side 840f toward the fifth side 820e of the bottom rim 820. In other words, the top rim 840 may be affixed and/or adhered to the bottom rim 820 by snapping on the top rim 840 corresponding to the ridge 821 of the bottom rim 820. Alternatively, the top rim 840 may be affixed and/or adhered to the ridge 821 of the bottom rim 820 by a magnet, a Velcro strip, a zipper, etc., but is not limited thereto. As such, the top rim 840 and the bottom rim 820 may be removably connected. As such, the top rim 840 may prevent the retractable cover 830 from any vertical movement.

Additionally, the sixth side 840f of the top rim 840 and the ridge 821 of the bottom rim 820 may create at least one bar-sliding groove 850, such that the at least one bar-sliding groove 850 may be disposed between at least a portion of the second side 840b of the top rim 840 and the second side 820b of the bottom rim 820, as well as, at least a portion of the fourth side 840d of the top rim 840 and the fourth side 820d of the bottom rim 820. The at least one bar-sliding groove 850 may enable the weighted bar 833 to slide between the ridge 821 and the sixth side 840f of the top rim 840, as the user desires. Alternatively, the at least one bar sliding groove 850 may be disposed between at least a portion of the first side 840a of the top rim 840 and the first side 820a of the bottom rim 820, as well as, at least a portion of the third side 840c of the top rim 840 and the third side 820c of the bottom rim 820. The opening 842 may enable the user to access the retractable cover 830. The opening 842 may allow the user to access the retractable cover 820.

The at least one bar-sliding groove 850 may allow the weighted bar 833 to slide between the top rim 840 and the bottom rim 820, as the user desires, thereby opening and closing access to the basin 810.

Referring to FIGS. 8A through 8C, the weighted bar 833 may be a rectangular tube or a circular tube in shape, may extend a distance over the base 811, and may be disposed within at least a portion of the at least one bar-sliding groove 850. The user may grasp the handle 836, such that the weighted bar 833 may move to slide across the top rim 840 from the first side 840a across the opening 842 to the third side 840c, but is not limited thereto. Alternatively, the weighted bar 833 may be opened and/or closed in the opposite direction. In other words, the retractable cover 830 may be disposed within the top rim 840 such that the weighted bar 833 may at least partially close by sliding across the top rim 840 from the third side 840c to the first side 840a, but is not limited thereto.

The body 834 may fold along the at least one hinge 835, multiple times, to create an accordion fold, half fold, tri-fold, z fold, roll fold, etc., but is not limited thereto. The body 834 may also fold along the at least one hinge 835, horizontally, vertically, diagonally, circularly, etc., but is not limited thereto. In this manner, the weighted bar 833 may be used to open and/or close access to any food within the basin 810. The body 834 may be transparent allowing the contents, such as food, of the base 811 to be viewed.

When the retractable lid 830 is closed, insects and inclement weather may be prevented from contaminating the food. The chafing dish 800 may improve any event that includes a cookout and/or catering.

Figure 9A:
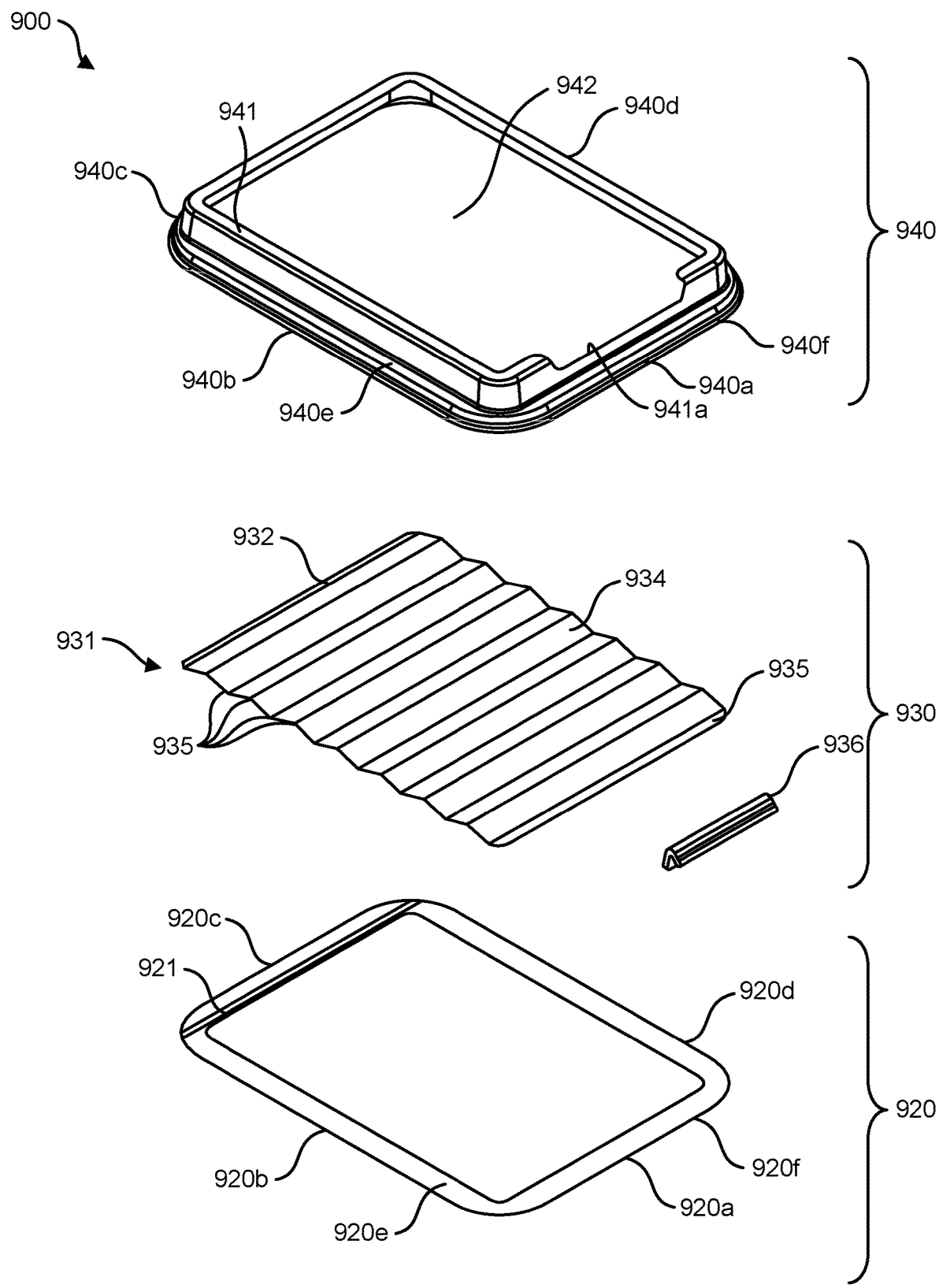
FIG. 9A illustrates an exploded view of a chafing dish having retractable cover, according to another exemplary embodiment of the present general inventive concept.

FIG. 9A illustrates an exploded view of a chafing dish 900 having retractable cover, according to another exemplary embodiment of the present general inventive concept.

Figure 9B:
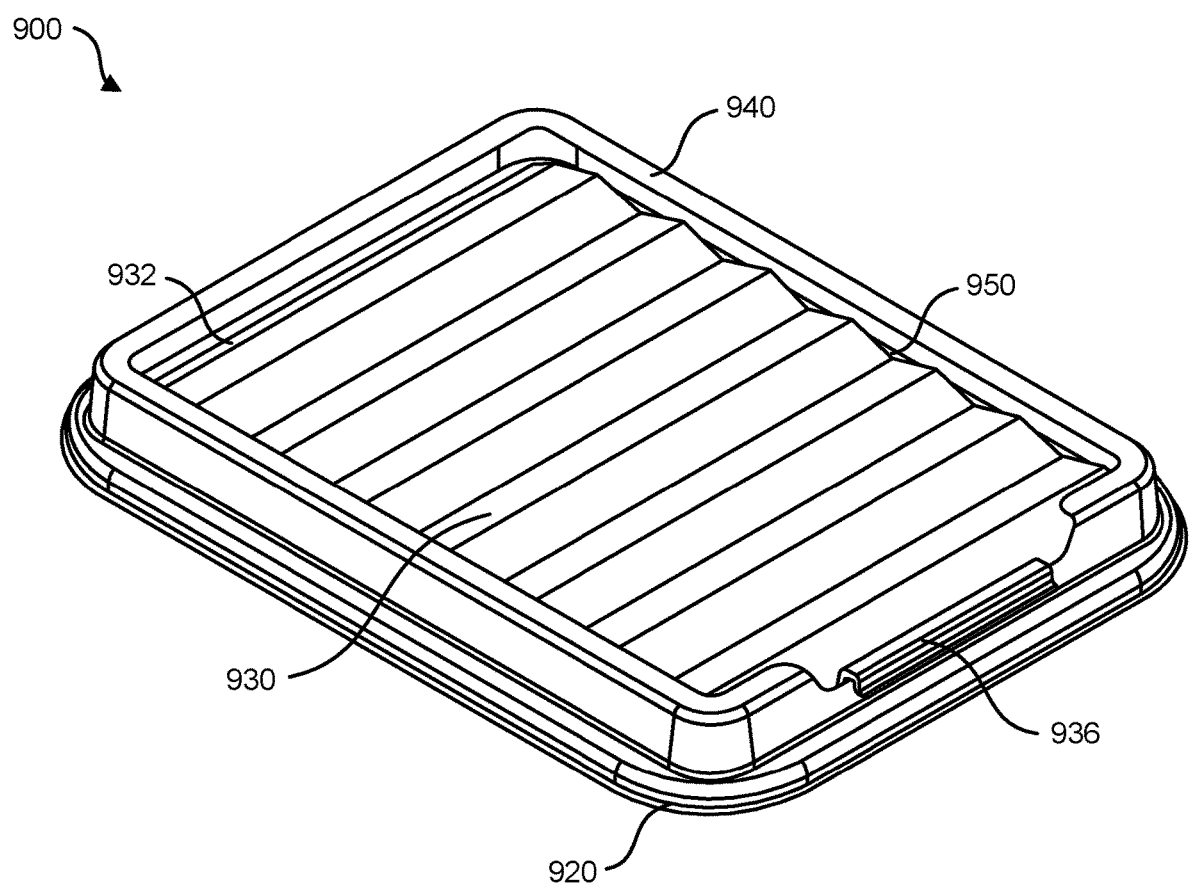
FIG. 9B illustrates an isometric perspective view of the chafing dish having retractable cover in a closed position, according to another exemplary embodiment of the present general inventive concept.

FIG. 9B illustrates an isometric perspective view of the chafing dish 900 having retractable cover in a closed position, according to another exemplary embodiment of the present general inventive concept.

Figure 9C:
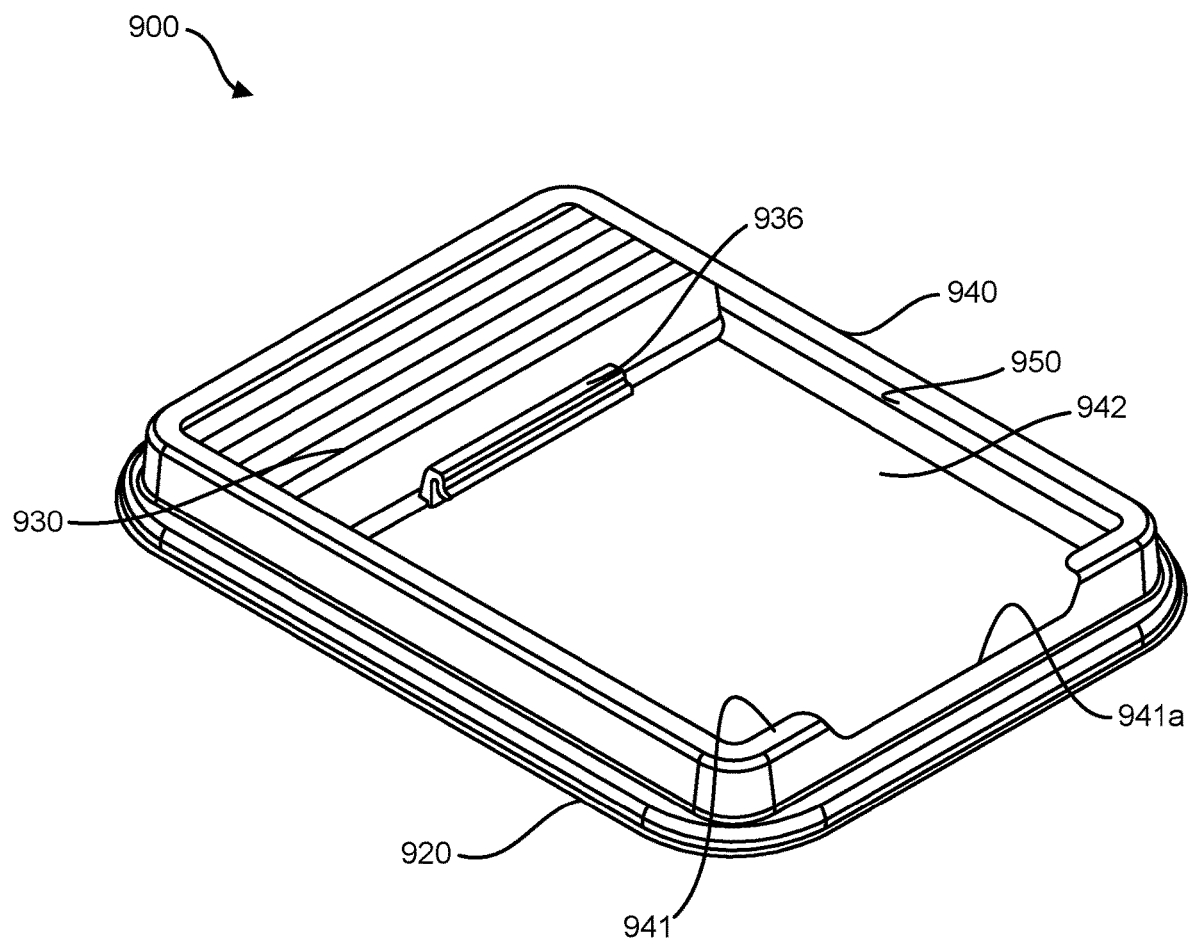
FIG. 9C illustrates an isometric perspective view of the chafing dish having retractable cover in an opened position, according to another exemplary embodiment of the present general inventive concept.

FIG. 9C illustrates an isometric perspective view of the chafing dish 900 having retractable cover in an opened position, according to another exemplary embodiment of the present general inventive concept.

Figure 9D:
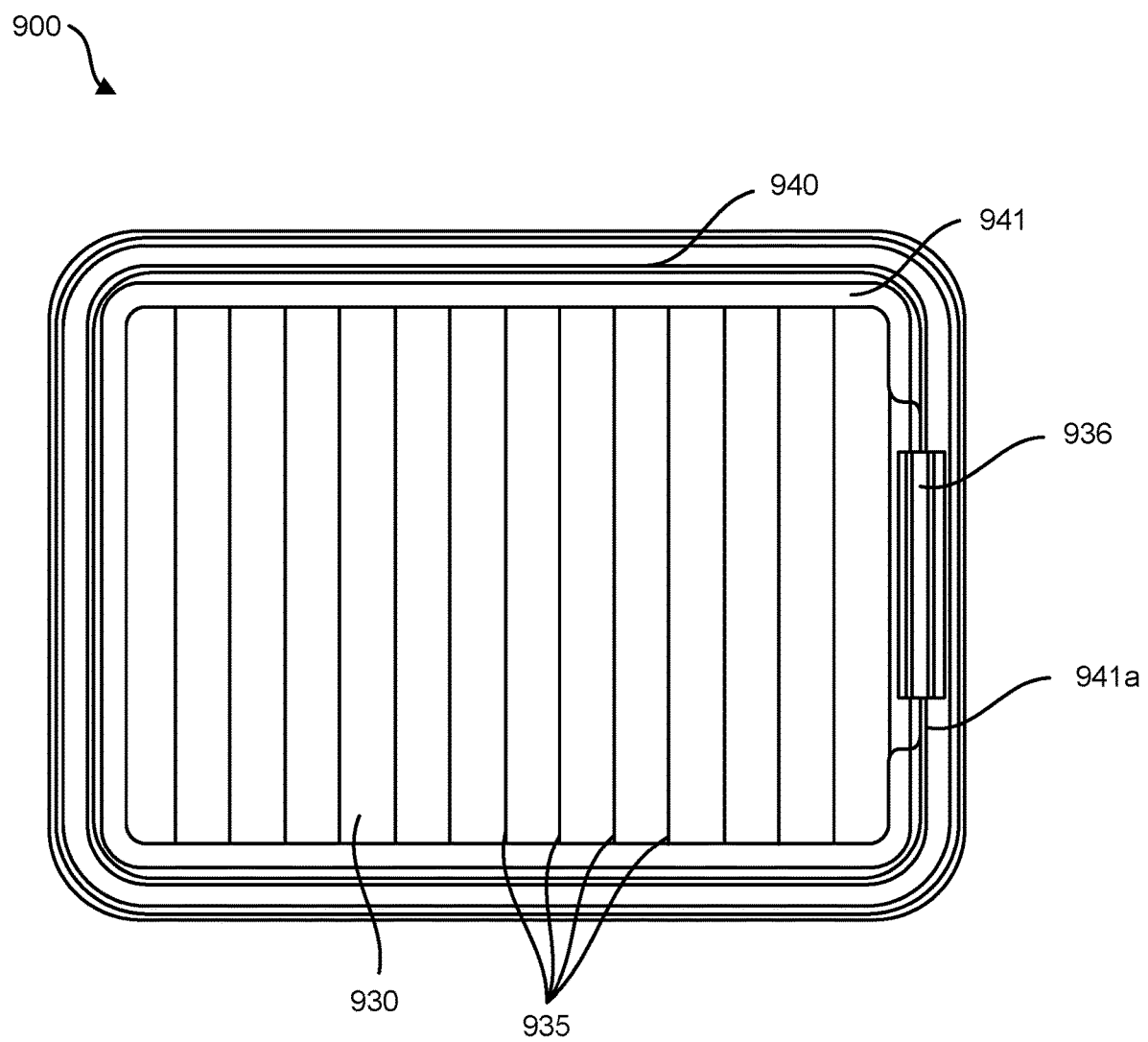
FIG. 9D illustrates a top view of the chafing dish having retractable cover in the closed position, according to another exemplary embodiment of the present general inventive concept.

FIG. 9D illustrates a top view of the chafing dish 900 having retractable cover in the closed position, according to another exemplary embodiment of the present general inventive concept.

Figure 9E:
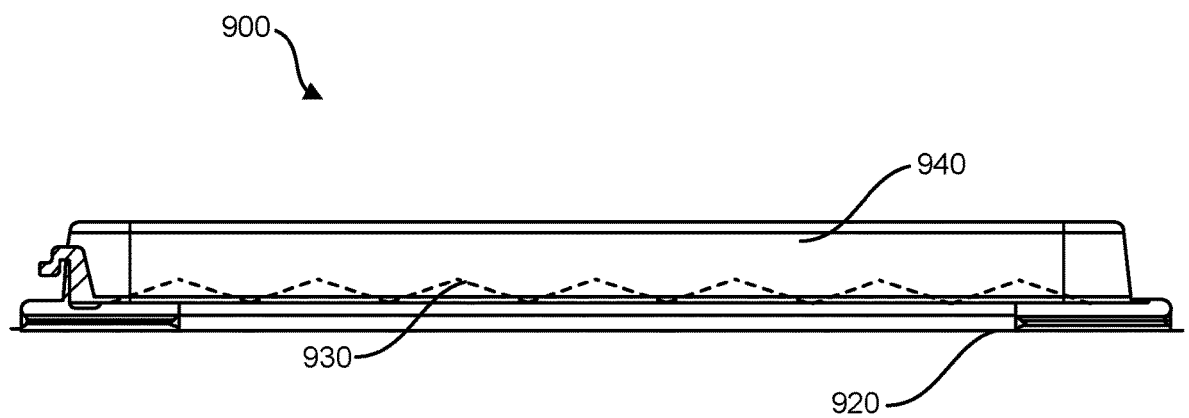
FIG. 9E illustrates a side view of the chafing dish having retractable cover, according to another exemplary embodiment of the present general inventive concept.

FIG. 9E illustrates a side view of the chafing dish 900 having retractable cover, according to another exemplary embodiment of the present general inventive concept.

The chafing dish 900 may include a bottom rim 920, a retractable cover 930, and a top rim 940, but is not limited thereto.

Although, the chafing dish 900 is illustrated in FIGS. 9A through 9E to have a rectangular prism shape, the chafing dish 900 may be a square prism, a circular prism, a conical prism, a spherical prism, a pentagonal prism, a hexagonal prism, an octagonal prism, or any feasible shape desired by the user. The chafing dish 900 may be constructed from at least one of aluminum, wood, plastic, stone, ceramic, closed-cell extruded polystyrene foam, etc., but is not limited thereto. Furthermore, the material used to construct the chafing dish 900 may be tempered to improve adaptation to changing temperatures.

Referring to FIG. 9A, the bottom rim 920 may include a first side 920a, a second side, 920b, a third side, 920c, a fourth side 920d, a fifth side 920e, a sixth side 920f, and an adhesive portion 921, but is not limited thereto.

The first side 920a may be substantially parallel to the third side 920c, and the second side 920b may be substantially parallel to the fourth side 920d.

The top rim 920 in FIG. 9A is illustrated to include the second side 920b and the fourth side 920d as being longer than the first side 920a and the third side 920c (collectively, all four sides of the bottom rim 920), but is not limited thereto. Alternatively, the first side 920a and the third side 920c may be longer than the second side 920b and the fourth side 920d (or all the sides 920a-d may have equal lengths).

Referring to FIG. 9A, the adhesive portion 921 is illustrated to be disposed on at least a portion of the fifth side 920e near the third side 920c of the bottom rim 920. However, the adhesive portion 921 may be disposed on at least a portion of the first side 920a, the second side 920b, the fourth side 920d, and/or the sixth side 920f, but is not limited thereto. The adhesive portion 921 may be at least one of a tape, a glue, a snap, a clasp, a magnet, and hooks and loops, but is not limited thereto.

The retractable cover 930 may include an edge side 931, an adhesive portion 932, a weighted bar 933, a body 934, at least one hinge 935, and a hooking handle 936, but is not limited thereto.

The adhesive portion 932 may be disposed on at least a portion of the edge side 931, but is not limited thereto. The adhesive portion 932 may be at least one of a tape, a glue, a snap, a clasp, a magnet, and hooks and loops, but is not limited thereto.

The retractable cover 930 may be disposed on at least a portion of the adhesive portion 921. Specifically, the adhesive portion 932 may be disposed on at least a portion of fifth side 920e near the third side 920c of the bottom rim 920 corresponding to the adhesive portion 921. Alternatively, the adhesive portion 932 may be disposed on at least a portion of the sixth side 920f near the third side 920c of the bottom rim 920.

The top rim 940 may include a first side 940a, a second side 940b, a third side 940c, a fourth side 940d, a fifth side 940e, a sixth side 940f, a ridge 941, and an opening 942, but is not limited thereto.

The first side 940a may be substantially parallel to the third side 940c, and the second side 940b may be substantially parallel to the fourth side 940d.

The top rim 940 in FIG. 9A is illustrated to include the second side 940b and the fourth side 940d as being longer than the first side 940a and the third side 940c, but is not limited thereto. Alternatively, the first side 940a and the third side 940c may be longer than the second side 940b and the fourth side 940d (or all the sides 940a-d may have equal lengths).

The first side 940a, the second side 940b, the third side 940c, and the fourth side 940d (collectively, all four sides of the top rim 940) may extend a lateral distance outward greater than a lateral distance each of the four sides of the bottom rim 920 extend outward. The top rim 940 may be removably affixed and/or adhered to the bottom rim 920. Specifically, all four sides of the top rim 940 may be affixed and/or adhered to the corresponding all four sides of the bottom rim 920 by directing the sixth side 940f toward the fifth side 920e of the bottom rim 920. As such, the top rim 940 and the bottom rim 920 may be merged. As such, the top rim 940 may prevent the retractable cover 930 from any possible vertical movement.

Additionally, the sixth side 940f of the top rim 940 and the fifth side 920e of the bottom rim 920 may create at least one bar-sliding groove 950, such that the at least one bar-sliding groove 950 may be disposed between at least a portion of the second side 940b of the top rim 940 and the second side 920b of the bottom rim 920, as well as, between at least a portion of the fourth side 940d of the top rim 940 and the fourth side 920d of the bottom rim 920. The at least one bar-sliding groove 950 may enable the weighted bar 933 to slide between the fifth side 920e of the bottom rim 920 and the sixth side 940f of the top rim 940, as the user desires. Alternatively, the at least one bar sliding groove 950 may be disposed between at least a portion of the first side 940a of the top rim 940 and the first side 920a of the bottom rim 920, as well as, between at least a portion of the third side 940c of the top rim 940 and the third side 920c of the bottom rim 920. The opening 942 may enable the user to access the retractable cover 930.

The at least one bar-sliding groove 950 may allow the weighted bar 933 to slide between the top rim 940 and the bottom rim 920, as the user desires, thereby opening and/or closing access through the opening 942.

The ridge 941 may include an indented portion 941a, but is not limited thereto.

Referring to FIGS. 9A through 9E, the weighted bar 933 may be a rectangular tube or a circular tube in shape. Additionally, the weighted bar 933 may be partially disposed within at least a portion of the at least one bar-sliding groove 950. The indented portion 941a may be disposed on at least a portion of the ridge 941 near the first side 940a of the top rim 940. The user may grasp the hooking handle 936 to lift the hooking handle 936 in a vertical direction away from the indented portion 941a, such that the weighted bar 933 may slide across the top rim 940 from the first side 940a across the opening 942 to the third side 940c, but is not limited thereto. Alternatively, the weighted bar 933 may be opened and/or closed in the opposite direction. In other words, the retractable cover 930 may be disposed within the top rim 940, such that the weighted bar 933 may at least partially close by sliding across the top rim 940 from the third side 940c to the first side 940a, such that the hooking handle 936 may be removably connected to the indented portion 941a, but is not limited thereto.

The body 934 may fold along the at least one hinge 935, multiple times, to create an accordion fold, half fold, tri-fold, z fold, roll fold, etc., but is not limited thereto. The body 934 may also fold along the at least one hinge 935, horizontally, vertically, diagonally, circularly, etc., but is not limited thereto. The body 934 may be transparent, such that the user may view through the body 934.

When the retractable lid 930 is closed, insects and inclement weather may be prevented from contaminating the food. The chafing dish 900 may improve any event that includes a cookout and/or catering.

Figure 10:
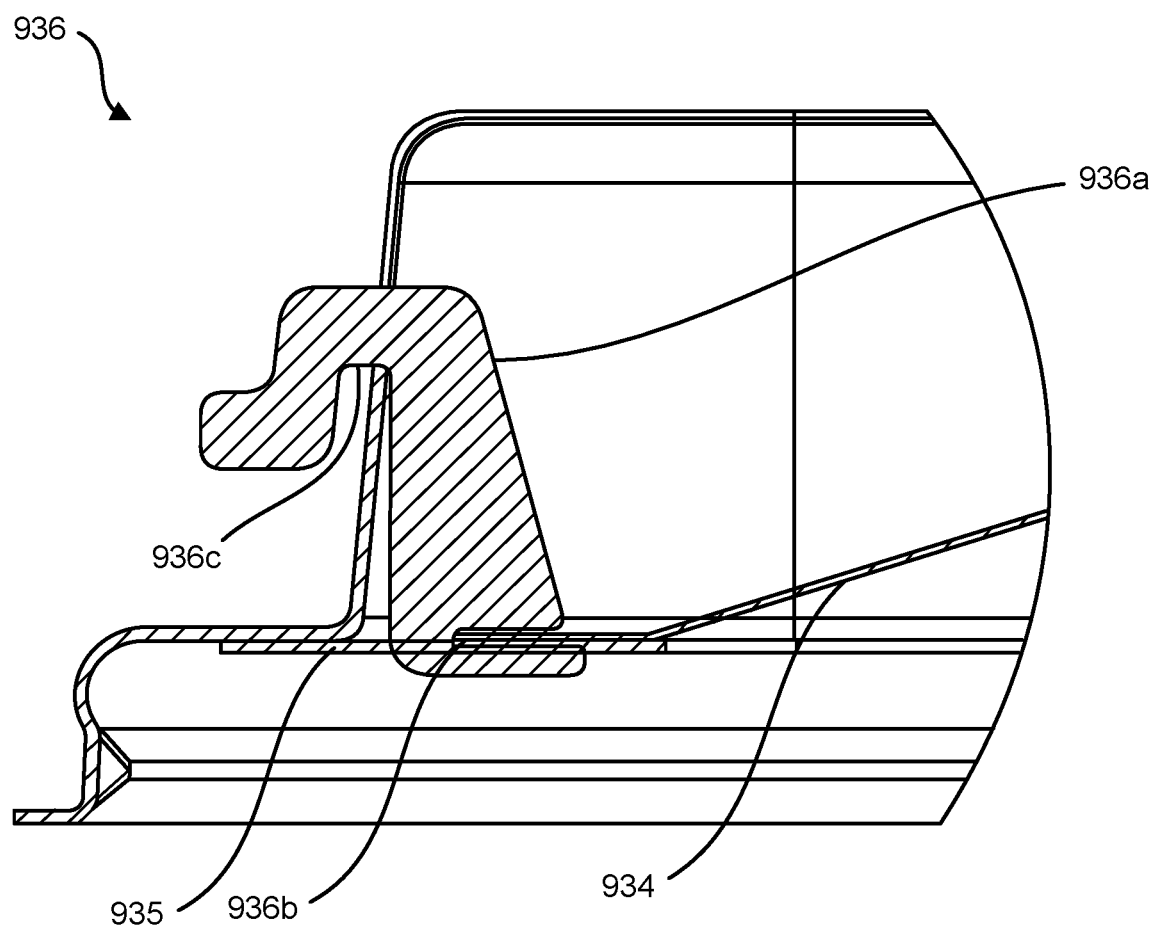
FIG. 10 illustrates a zoomed in view of a hooking handle, according to another exemplary embodiment of the present general inventive concept.

FIG. 10 illustrates a zoomed in view of a hooking handle 936, according to another exemplary embodiment of the present general inventive concept.

The hooking handle 936 may include a hooking body 936a, a retractable cover-receiving groove 936b, and an indented portion-receiving groove 936c, but is not limited thereto.

The indented portion-receiving groove 936c of the hooking body 936a may be removably connected to the indented portion 941a of the top rim 940 in response to the retractable cover 930 being in the closed position. In other words, the indented portion-receiving groove 936c may receive at least a portion of the indented portion 941a in response to the retractable cover 930 being in the closed position. As such, the retractable cover 930 may resist movement while the hooking body 936a is removably connected to the indented portion 941a of the top rim 940. Furthermore, the body 934 of the retractable cover 930 may be disposed within at least a portion of the retractable cover-receiving groove 936b, such that the body 934 moves in response to movement of the hooking handle 936.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A chafing dish, comprising:
a basin including a well to store items therein, the basin comprising a lower groove forming portion disposed on at least a portion of the basin;
a retractable lid disposed on at least a portion of a top surface of the basin to retract to an open position to open access to the well, and to expand to a closed position to close access to the well, the retractable lid comprising:
 a body to cover the well when the retractable lid is in the closed position;
 an edge side disposed at a first end of the retractable lid to contact a first side of the top surface of the basin, and
 a weighted bar disposed at a second end of the retractable lid to slide toward the edge side to open access to the well and to slide away from the edge side to close access to the well,
a top rim to cover at least a portion of an outer surface of the retractable lid, the top rim comprising an upper groove-forming portion to contact at least a portion of the lower groove-forming portion to create bar-sliding grooves disposed at side portions of the basin to receive respective ends of the weighted bar therein to allow the weighted bar to slide within the bar-sliding grooves toward and away from the edge side.

2. The chafing dish of claim 1, wherein the body of the retractable lid is transparent to allow a user to view the items stored within the well when the retractable lid is closed.

3. The chafing dish of claim 1, wherein the first side of the top surface of the basin comprises at least one peg to extend perpendicularly away from the first side of the top surface of the basin.

4. The chafing dish of claim 3, wherein the edge side comprises at least one aperture to receive the at least one peg therein to affix the edge side to the first side of the top surface of the basin.

5. The chafing dish of claim 1, wherein the body of the retractable lid comprises at least one hinge to fold the body when the retractable lid is opened.

6. A chafing dish lid to cover a chafing dish with a basin having a top surface, the chafing dish lid comprising:
a bottom rim to be placed on a top portion of the chafing dish, the bottom rim comprising:
 an opening disposed at a center portion of the bottom rim;
a top rim comprising:
 a ridge to form a perimeter of the top rim, and
 an indented portion disposed on at least a portion of the ridge and having a height less than a height of the ridge; and
a retractable lid disposed on at least a portion of a top surface of the bottom rim, and having at least a portion covered by the top rim, to retract to an open position to open access to the opening and to expand to a closed position to close access to the opening, the retractable lid comprising:
 a body to cover the opening when the retractable lid is in the closed position,
 an edge side disposed at a first end of the retractable lid and affixed to a first side of the top surface of the basin, and
 a hooking handle disposed on at least a portion of the body to removably connect to the indented portion to resist movement of the body while the hooking handle remains connected to the indented portion below the height of the ridge.

7. The chafing dish lid of claim 6, wherein the retractable lid further comprises:
a weighted bar disposed at a second end of the retractable lid to slide toward the edge side to open access to the opening and to slide away from the edge side to close access to the opening.

8. The chafing dish lid of claim 6, wherein the bottom rim further comprises:
a lower groove forming portion disposed on at least a portion of the top surface of the bottom rim.

9. The chafing dish lid of claim 8, wherein the top rim further comprises:
an upper groove forming portion to contact at least a portion of the lower groove forming portion to allow at least a portion of the retractable lid to slide laterally to open and close the opening.

10. The chafing dish lid of claim 8, wherein the retractable lid further comprises:
a weighted bar disposed at a second end of the retractable lid to slide along the lower groove forming portion toward the edge side to open access to the opening and to slide away from the edge side to close access to the opening.

11. The chafing dish lid of claim 10, wherein the top rim further comprises:

an upper groove forming portion contacting at least a portion of the lower groove forming portion to create a bar-sliding groove, such that the weighted bar is slidable therebetween.

12. The chafing dish lid of claim 6, wherein the bottom rim further comprises:
at least one peg to extend perpendicularly away from a first side of the top surface of the bottom rim to receive the retractable lid thereon.

13. A chafing dish lid to cover a chafing dish, the chafing dish lid comprising:
a bottom rim to be placed on a top portion of the chafing dish;
a top rim to be placed atop the bottom rim, the top rim comprising:
a ridge to form a perimeter of the top rim, and
an indented portion disposed on at least a portion of the ridge and having a height less than a height of the ridge; and
a retractable lid having side portions disposed at least partially between the bottom rim and the top rim such that the retractable lid slides laterally between a first position in which access to the chafing dish is closed and a second position in which access to the chafing dish is opened, the retractable lid comprising:
a body to cover the opening when the retractable lid is in the closed position, and
a hooking handle disposed on at least a portion of the body to removably connect to the indented portion to resist movement of the body while the hooking handle remains connected to the indented portion below the height of the ridge.

14. The chafing dish lid of claim 12, wherein the bottom rim further comprises:
at least one peg to extend perpendicularly away from a first side of a top surface of the bottom rim to receive the extractable lid thereon.

* * * * *